United States Patent [19]
Zaugg

[11] 3,819,356
[45] June 25, 1974

[54] OXAZOLES AND THEIR USE AS HERBICIDES

[75] Inventor: Harold Elmer Zaugg, Lake Forest, Ill.

[73] Assignee: Abbott Laboratories, North Chicago, Ill.

[22] Filed: Mar. 1, 1972

[21] Appl. No.: 230,936

Related U.S. Application Data

[62] Division of Ser. No. 83,661, Jan. 23, 1970, abandoned.

[52] U.S. Cl. .................................................. 71/88
[51] Int. Cl. ............................................. A01n 9/22
[58] Field of Search ........................................ 71/88

[56] References Cited
UNITED STATES PATENTS 2,856,277  10/1958  Bluestone et al. .................... 71/88
3,578,673  5/1971  Bruson et al. ...................... 260/307

Primary Examiner—Lewis Gotts
Assistant Examiner—Catherine L. Mills
Attorney, Agent, or Firm—Robert L. Niblack; James L. Bailey

[57] ABSTRACT

Covers oxazoles of the formula

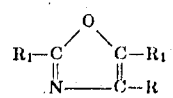

where R is a halo group and $R_1$ is an aryl group. Also covers their method of employment as herbicides.

1 Claim, No Drawings

OXAZOLES AND THEIR USE AS HERBICIDES

REFERENCES TO RELATED APPLICATIONS

This application is a divisional application of my copending application bearing Ser. No. 83,661, filed Jan. 23, 1970 now abandoned.

BACKGROUND OF THE INVENTION

The use of herbicides to control and inhibit undesirable weed growth is well known and of wide-spread usage in the agricultural, industrial and domestic fields. Roadsides, embankments and other earth surfaces are often subjected to treatment with toxic chemicals, organic and inorganic. These numerous compounds with a wide-spread variance in functionality are effective in inhibiting or destroying the growth of undesirable vegetation.

Obnoxious plants or weeds which interfere with human operations may be broadly classified into two groups. These two groups are known generally as broad leaf plants and grasses. Herbicides have been broadly classified with regard to their activity in combatting these pervasive-type plants. If the herbicide is effective in destroying or inhibiting the growth of both broadleaf plants and grasses, it is considered to be a non-selective-type herbicide. Again, those which have only limited activity on certain type plants are known as selective herbicides. However, a non-selective herbicide, while giving good control initially, may have the disadvantage of giving only a short term control. Frequently, massive dosages of herbicidally active chemicals are required for a long-term kill and such use, therefore, becomes economically impractical.

Numerous other disadvantages are inherent in many types of herbicides. For example, many are susceptible to direct bacterial decomposition. Other herbicides are leached from the soil by water and rendered ineffective. Because of solubility problems, some herbicides have the disadvantage of being very difficult to apply. In fact, some of the very effective herbicides are insoluble in either hydrocarbon or aqueous-type solvents and many are incapable of even being emulsified satisfactorily. Also toxicity problems are inherent in the use of many well known herbicides. All of these problems make many classes of herbicides either dangerous, or ineffective, or uneconomical to use.

The purpose of this invention then is to eliminate all or part of the above inadequacies by providing compositions of matter that are particularly unique in their chemical make-up. The newly invented compositions are less subject to the above described limitations than many previously known herbicides.

Therefore, it becomes an object of the invention to provide new herbicidal compositions.

A further object is to provide herbicidal compositions which will control a wide variety of undesirable vegetation, including members of both the two general classes of broad leaf species and grasses.

A very important object of the invention is to furnish herbicidal compositions which are easy to prepare and also economical to use.

Other objects will appear hereinafter.

DETAILED DESCRIPTION OF THE INVENTION

In accordance with the invention a new class of herbicides have been synthesized. These oxazoles have the following general structural formula:

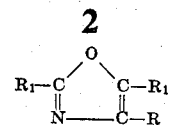

where R is halo group and $R_1$ is an aryl group. R usually is chloro, bromo or fluoro. $R_1$ may be phenyl or a substituted phenyl group. The phenyl group may contain such substituents as halo including chloro and fluoro, hydroxy, nitro, lower alkyl, cyano, etc. Likewise, the phenyl group may be substituted with a plurality of such groups or others.

The new compounds here may be made on a number of ways. One excellent method involves starting with an N-trihaloalkyl benzamide, which class of materials is known [Synthesis, 49 (1970)]. The first step in the reaction involves cyclization of the above to yield the 1-benzoyl-2,2-dihaloaziridine. One excellent means of cyclization involves treatment of the benzamide with sodium hydride in dimethylformamide solvent.

The above aziridine class of materials is then heat treated such as via boiling xylene and rearranges to the oxazole compound.

The following examples illustrate preparation of a typical compound of the invention and its efficacy as a herbicide. It is understood, of course, that these examples are merely illustrative and that the invention is not to be limited thereto.

EXAMPLE 1

Preparation of 1-Benzoyl-2,2-dichloro-3-phenylaziridine

A solution of N-(2,2,2-trichloroethyl-1-phenyl)-benzamide (37.2 g., 0.113 mol, mp 172°–173°) in dimethylformamide (200 ml.) was added to a suspension of sodium hydride (4.9 g., 0.202 mol) in dimethylformamide. The mixture was then stirred at 40° for 5–6 hours and overnight at room temperature. The dark brown reaction mixture was poured onto ice. The precipitated amber colored oil solidified, was collected at the filter, and dried in vacuo at 45°–50°. This crude product (27 g., mp 80°–90°) was recrystallized once from methanol (200 ml. + charcoal) to give 20.6 g. (62 percent) of product mp 96°–98°. Another recrystallization gave a pure product mp 97°–98°; ir (CHCl$_3$) 1,700 cm$^{-1}$(amide I), no NH; nmr (CDCl$_3$) δ 8.5–7.5 (m, 10, ArH) and 4.28 ppm (s, 1, NCH). Analysis calculated for $C_{15}H_{11}Cl_2NO$: C, 61.66; H, 3.80; Cl, 24.27 N, 4.80

Found: C, 61.78; H, 3.92; Cl, 24.58 N, 4.66

The following describes the above reaction sequence.

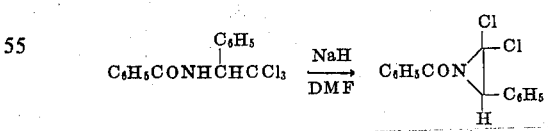

EXAMPLE 2

Preparation of 4-chloro-2,5-diphenyloxazole

A solution of the product of Example 1 (5 g., 0.0171 mol) in xylene (30 ml.) was heated under reflux overnight. The solvent was removed by distillation under reduced pressure and the residual solid (4.3 g.) was recrystallized (charcoal) from methanol to give 4-chloro-2,5-diphenyloxazole (3.55 g., 81 percent, mp 67°–69°). Two more recrystallizations gave a pure product, mp 69°-70°; uv max (C₂H₅OH) 224 (ε 16,600) and 307 mμ (ε 25,300). Analysis calculated for $C_{15}H_{10}ClNO$: C, 70.45; H, 3.94; Cl, 13.87 N, 5.48; O, 6.26

Found: C, 70.59; H, 4.06; Cl, 13.67 N, 5.31; O, 6.50

The reaction sequence here is as follows.

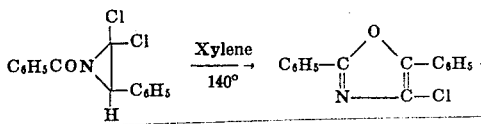

EXAMPLE 3

The compound of Example 2 was then tested for its herbicidal activity.

A water-isopropyl alcohol solution of the compound was prepared and sprayed right after the seeds of the test plants were planted. The pre-emergence treatment dosage was 10 pounds per acre. Approximately 2-3 weeks later readings were made as to activity of the material. The scale of readings range from 0 to 10, with a 0 rating indicating no activity and a 10 rating indicating complete activity.

Specifically, the herbicidal material of Example 2 was tested against Johnson grass rhizome in the pre-emergence type of test. No growth of Johnson's grass so treated was noted.

The new compositions here are active against a variety of noxious plants. Good growth control of undesirable vegetation has been accomplished through the use of the herbicides here in treatment amounts ranging from 2 to 600 pounds per acre. The more preferred amounts of herbicide used here range from about 5 to about 50 pounds per acre. The above suggested dosage required for weed control with compositions of the invention will depend, of course, upon the circumstances of each individual situation. One skilled in the art may, using conventional weed control techniques, quickly ascertain the amount that is necessary to be applied in effective dosages.

The preferred mode of application involves spraying solutions of the active ingredients. However, other conventional means of applying the herbicides here may also be used such as dusting, applying pellets, etc.

The herbicidal chemicals here are generally applied in solution form and in one of the following liquid forms: water, oil, oil-in-water emulsions and water-in-oil emulsions. Usually, solutions of water and an organic solvent such as an alcohol are employed to solubilize the active ingredients. In most instances, the water component comprises at least 60 percent by weight of the solution. The aqueous or other solutions containing the herbicide may also contain emulsifying agents, surface-active chemicals, dispersing aids, etc.

Oil-containing herbicidal solutions, straight oil solutions, oil-in-water emulsions and water-in-oil emulsions may be made using a variety of hydrocarbons or petroleum products such as kerosene, mineral oil, naphthas, gas oils, crude oils, light distillates, etc. In most instances, the hydrocarbon oil carrier for the herbicide is itself phytotoxic.

The herbicides here may be employed along with a number of known herbicides including substituted uracils as 5-bromo-3-sec-butyl-methyl uracil; aryl, alkyl urea herbicides as 1-phenyl-3-methyl urea; acidic herbicides such as 2,4-dichlorophenoxy acetic acid and 4-chlorophenoxy acetic acid; substituted picolinic acids as 4-amino-3,5,6-trichloropicolinic acid; salts, esters, amides of the above herbicidal acids or others; maleic hydrazide and its herbicidal derivatives; sulfamic acid and its salts; alkaline salts of cyanic acids; sodium borates; sodium cyanamide; phenyl mercury salts; dinitrophenols and their salts; amine-substituted s-triazines; and boron trifluoride amine complexes. Various combinations of the just mentioned herbicides and others may also be employed in conjunctive use with the new class of herbicides discovered here.

I claim:

1. A method of controlling the growth of pre-emergence Johnson grass which comprises applying to the situs upon which said Johnson grass grows a phytocidal amount of 4-chloro-2,5-diphenyloxazole.

* * * * *